United States Patent
Krzesicki et al.

(10) Patent No.: US 6,743,138 B2
(45) Date of Patent: Jun. 1, 2004

(54) COMPACT DIFFERENTIAL HOUSING ASSEMBLY

(75) Inventors: Richard Michael Krzesicki, Ann Arbor, MI (US); Timothy James Johnson, Redford, MI (US); Gerald Stephen Szczepanski, Detroit, MI (US); Norman Szalony, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/201,472

(22) Filed: Jul. 23, 2002

(65) Prior Publication Data

US 2004/0018910 A1 Jan. 29, 2004

(51) Int. Cl.⁷ ............................................... F16H 48/08
(52) U.S. Cl. ........................ 475/230; 475/245; 475/247
(58) Field of Search ................................ 475/230, 243, 475/245, 246, 247

(56) References Cited

U.S. PATENT DOCUMENTS

| | | |
|---|---|---|
| 1,165,915 A | 12/1915 | Sparks |
| 1,476,329 A | 12/1923 | Duesenberg |
| 1,544,805 A | 7/1925 | Celander |
| 1,657,091 A | 1/1928 | Morgan |
| 1,704,803 A | 3/1929 | Mlinko |
| 1,802,545 A | 4/1931 | Acker |
| 1,987,716 A | 1/1935 | Skelton |
| 2,142,575 A | 1/1939 | Spicacci |
| 3,955,443 A | * 5/1976 | Estrada ........................ 475/230 |
| 3,974,717 A | * 8/1976 | Breed et al. ............. 475/230 X |
| 4,182,201 A | 1/1980 | Mayhew et al. |
| 4,363,248 A | 12/1982 | Brisabois |
| 6,024,666 A | 2/2000 | Bunnow |
| 6,056,663 A | 5/2000 | Fett |
| 6,093,127 A | 7/2000 | DiDomenico et al. |
| 6,146,304 A | 11/2000 | Bendtsen |
| 6,196,942 B1 | 3/2001 | Peterson et al. |
| 6,408,719 B1 | * 6/2002 | Seki et al. .............. 475/230 X |

FOREIGN PATENT DOCUMENTS

| | | | |
|---|---|---|---|
| EP | 420149 | * 4/1991 | .................. 475/230 |
| JP | 358207549 | * 12/1983 | .................. 475/230 |
| JP | 404083957 | * 3/1992 | ............. 475/230 X |
| JP | 406159450 | * 6/1994 | .................. 475/230 |

* cited by examiner

*Primary Examiner*—Ha Ho
(74) *Attorney, Agent, or Firm*—Brinks Hofer Gilson & Lione

(57) ABSTRACT

A differential axle assembly includes an axle housing having a pair of opposed openings. A differential gear set includes a pair of side gears. Each of the side gears are supported within one of the opposed openings. A plurality of pinion gears engage the side gears. A hypoid ring gear is rotatably supported within the axle housing and a pinion shaft is supported by the hypoid ring gear. The pinion shaft supports the pinion gears in engagement with the side gears. The hypoid ring gear includes a cylindrical inner diameter having a pair of axially spaced inwardly facing annular surfaces and the axle housing includes a pair of axially spaced outwardly facing annular surfaces. The hypoid ring gear is rotatably supported within the axle housing by a pair of roller bearings positioned between the annular surfaces.

21 Claims, 5 Drawing Sheets

COMPACT DIFFERENTIAL HOUSING ASSEMBLY

TECHNICAL FIELD

The present invention generally relates to a differential axle assembly wherein a differential gear set is supported within an axle housing. More specifically, the present invention relates to a differential axle assembly wherein the differential pinion gears are supported directly by a ring gear, thereby eliminating the need for a differential housing to support the differential gear set.

BACKGROUND

In an automotive vehicle, a differential gear assembly is used to transfer power from a rotating drive shaft to the axles and wheels of the vehicle. The rotating driveshaft of the vehicle is attached to a hypoid pinion gear, which engages a hypoid ring gear which is typically mounted onto a differential housing. The pinion and the ring gears are adapted to transfer rotation from the drive shaft to the differential housing such that the differential housing rotates perpendicular about the vehicle's z-axis, about which the driveshaft rotates. Within the differential housing, the ends of the axles of the vehicle are supported and connected to the differential housing through a differential gear set, such as a bevel differential gear set. Thus, the hypoid pinion and the ring gear set allow the driveshaft to rotate the differential housing in a direction perpendicular to the vehicle's z-axis, whereby the differential gear set rotates the axles of the vehicle to drive the wheels of the vehicle.

Typically the differential gear set includes a pair of side gears which are attached directly to the axles, and a pair of pinion gears which intermesh with the side gears. Most commonly, the pinion gears are supported by a pinion shaft which extends across the differential housing. The pinion gears are allowed to rotate on the pinion shaft thereby allowing the vehicle axles to rotate relative to one another. The rotational load is thus transferred from the driveshaft to the pinion gear, to the ring gear, through the differential housing and to the pinion shaft. Therefore, the differential housing must be designed with enough structural integrity so as to support the loads being transferred. The required strength, however, typically requires a relatively large differential housing which is expensive and heavy.

Thus, there is a need for a differential axle assembly with a differential gear set, wherein the hypoid ring gear and the differential side gears are supported directly by the axle housing, and the pinion gears are supported directly by the hypoid ring gear, thereby eliminating the differential housing and allowing the differential axle assembly to be designed with less structural size and weight.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
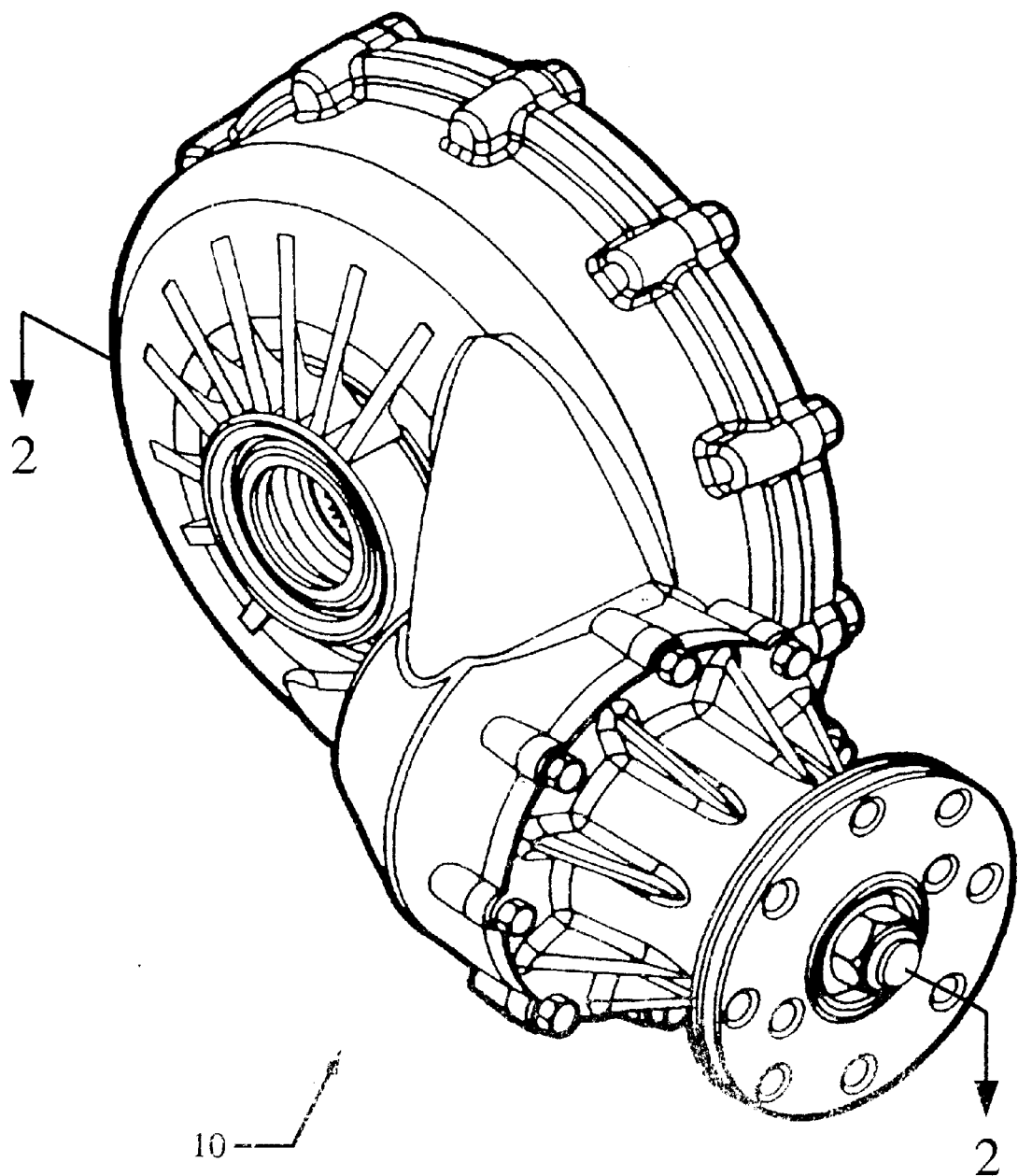
FIG. 1 is a perspective view of a differential axle assembly of the present invention.
Figure 2:
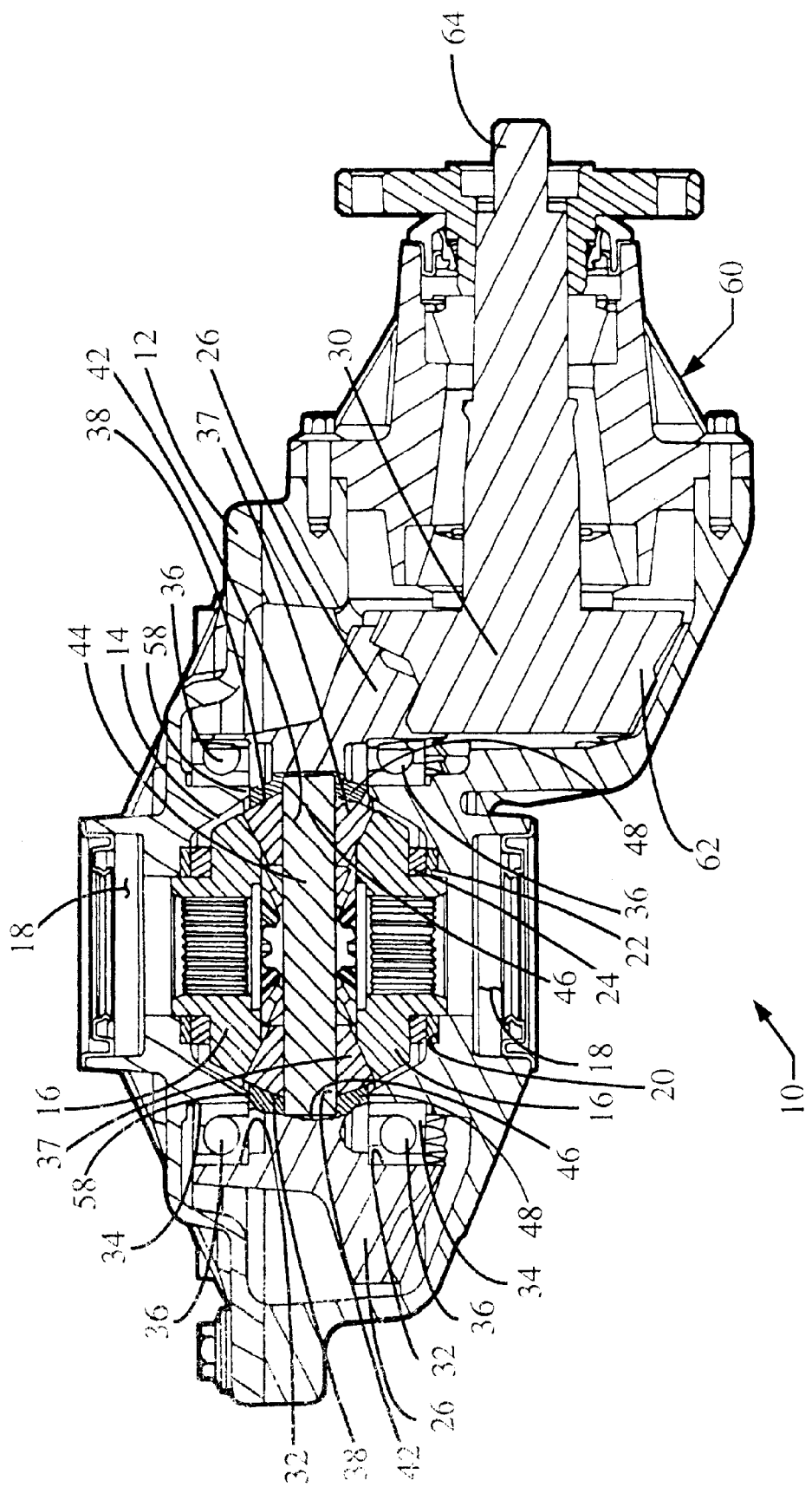
FIG. 2 is a sectional view taken along line 2—2 of FIG. 1.

Referring to FIGS. 1 and 2, a differential axle assembly is shown generally at 10. The differential axle assembly 10 includes an axle housing 12 which is adapted to receive a pair of axle half shafts (not shown). A differential gear set 14 is supported directly by the axle housing 12 within the axle housing 12. The differential gear set 14 is oriented within the axle housing 12 such that the axle half shafts engage the differential gear set 14 when the axle half shafts are received within the axle housing 12.

Referring to FIG. 2, the differential gear set 14 is preferably a bevel gear set. The differential gear set 14 generally includes a pair of side gears 16 which are substantially axially aligned and spaced apart from each other while being supported within the axle housing 12. Each of the side gears 16 is adapted to engage an end of an axle half-shaft of the vehicle. Preferably, the axle housing 12 includes a pair of opposing axially aligned openings 18, and one of the side gears 16 is supported within each of the axially aligned openings 18. Each of the opposing axially aligned openings includes a step 20, and each step 20 includes a thrust washer 22 positioned thereon to provide axial support for the side gears 16. Further, the differential axle assembly 10 includes a pair of thrust bearings 24, wherein one thrust bearing 24 is positioned between each of the side gears 16 and each of the thrust washers 22. The thrust bearings 24 allow the side gears 16 to rotate relative to the axle housing 12.

A hypoid ring gear 26 is rotatably mounted within the axle housing 12. The hypoid ring gear 26 is generally annularly shaped having a substantially circular inner surface 28 and a plurality of circumferentially spaced teeth extending obliquely from a side face of the hypoid ring gear 26. The teeth are adapted to provide smooth engagement with corresponding teeth on an input pinion gear 30 which is adapted to engage the drive shaft of the vehicle. Preferably, the cylindrical inner diameter 28 includes a pair of axially spaced inwardly facing annular surfaces 32. The axle housing 12 presents a pair of corresponding axially spaced outwardly facing annular surfaces 34.

The hypoid ring gear 26 is rotatably supported within the axle housing 12 by a pair of roller bearings 36 positioned between the inwardly facing annular surfaces 32 of the hypoid ring gear 26 and the outwardly facing annular surfaces 34 of the axle housing 12. Preferably, the hypoid ring gear 26 is supported within the axle housing 12 by a pair of ball bearings, or angular contact bearings, however, it is to be understood that the hypoid ring gear 26 can be supported by any appropriate type of bearing.

A plurality of pinion gears 37 are substantially opposed to one another and equally spaced along the inner surface 28 of the ring gear 26 and spaced apart from one another. Each of the pinion gears 37 engages the side gears 16. The pinion gears 37 have an outwardly facing first side 38 and an inwardly facing second side 40. Furthermore, each of the pinion gears includes a hole 42 extending from the first side 38 to the second side 40. The first side 38 of each pinion gear 37 presents a generally spherical surface.

A pinion shaft 44 is secured to and extends diametrically across the hypoid ring gear 26. The pinion shaft 44 extends through the holes 42 within the pinion gears 37 such that the pinion gears 37 are rotatably supported on the pinion shaft 44, in engagement with the side gears 16.

Figure 3:
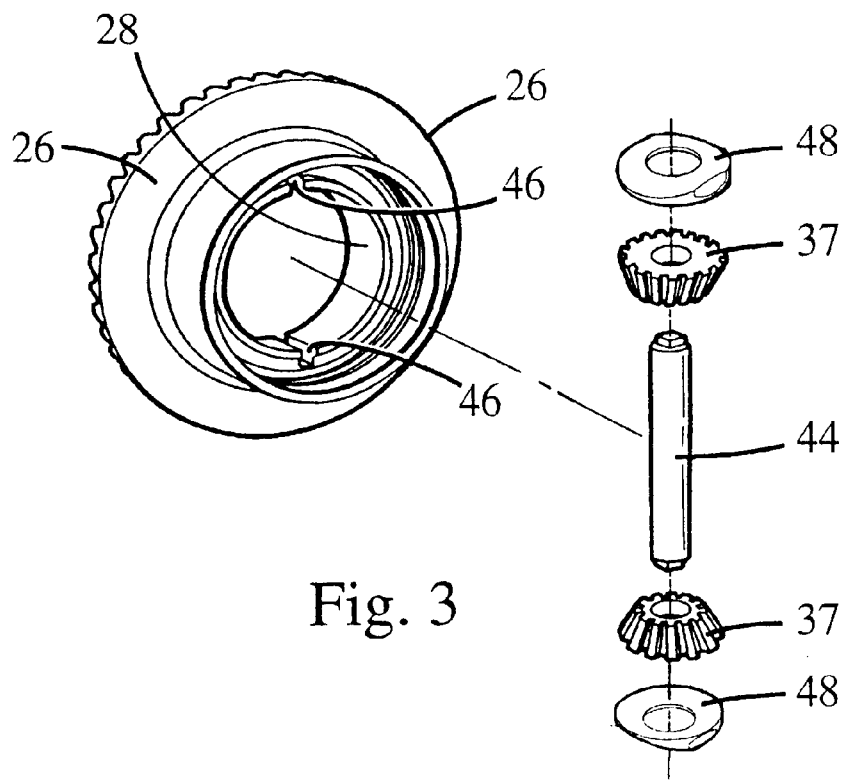
FIG. 3 is an exploded view of the hypoid ring gear, pinion pin, and pinion gears of a differential axle assembly wherein the pinion pin has two ends and supports two pinion gears.
Figure 5:
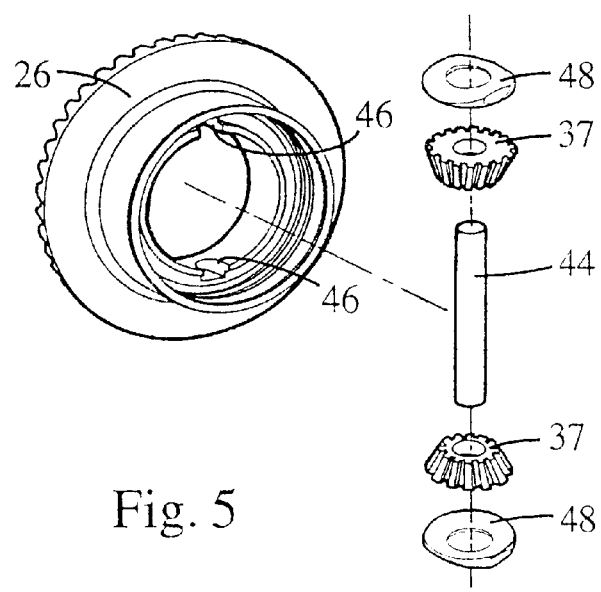
FIG. 5 is an exploded view similar to FIG. 3 with an alternative hypoid ring gear.

The cylindrical inner diameter 28 of the hypoid ring gear 26 includes a plurality of notches 46 formed therein. The notches 46 are formed between the axially spaced inwardly facing annular surfaces 32. The pinion shaft 44 engages the notches 46 within the hypoid ring gear 26 such that the pinion shaft 44 is supported by the hypoid ring gear 26. Referring to FIG. 3, the notches 46 can extend axially across the inner surface 28 of the hypoid ring gear 26, thereby allowing the pinion shafts 44 to slide into engagement with the hypoid ring gear 26 from either direction. Alternatively, the notches 46 can extend only partially across the inner surface 28 of the hypoid ring gear 26, thereby providing a stop against which the ends of the pinion pins 44 are supported, as shown in FIG. 5.

The distal ends of each of the axle half-shafts are connected to a wheel of the vehicle. The proximal end of each of the axle half-shafts engages one of the side gears 16, with the side gears 16 being engaged with the pinion gears 37. As such, rotation of the hypoid ring gear 26 is transferred through the pinion shafts 44 to the pinion gears 37, to the side gears 16 and to the axle half-shafts, all while allowing the axle half-shafts to rotate relative to one another. Therefore, the load from the drive-shaft is transferred directly from the hypoid pinion 30 to the hypoid ring gear 26, through the pinion shaft 44, and to the pinion gears 37, thereby allowing the differential axle assembly 10 to be designed in such a way that a separate differential housing is not necessary to provide support for the pinion shaft 44 and the bevel gears 16, 37. Preferably, the hypoid ring gear 26 and the pinion gears 37 are formed from hardened steel, however it is to be understood that other materials with similar hardness and strength properties could be used with substantially equal results.

Figure 4:
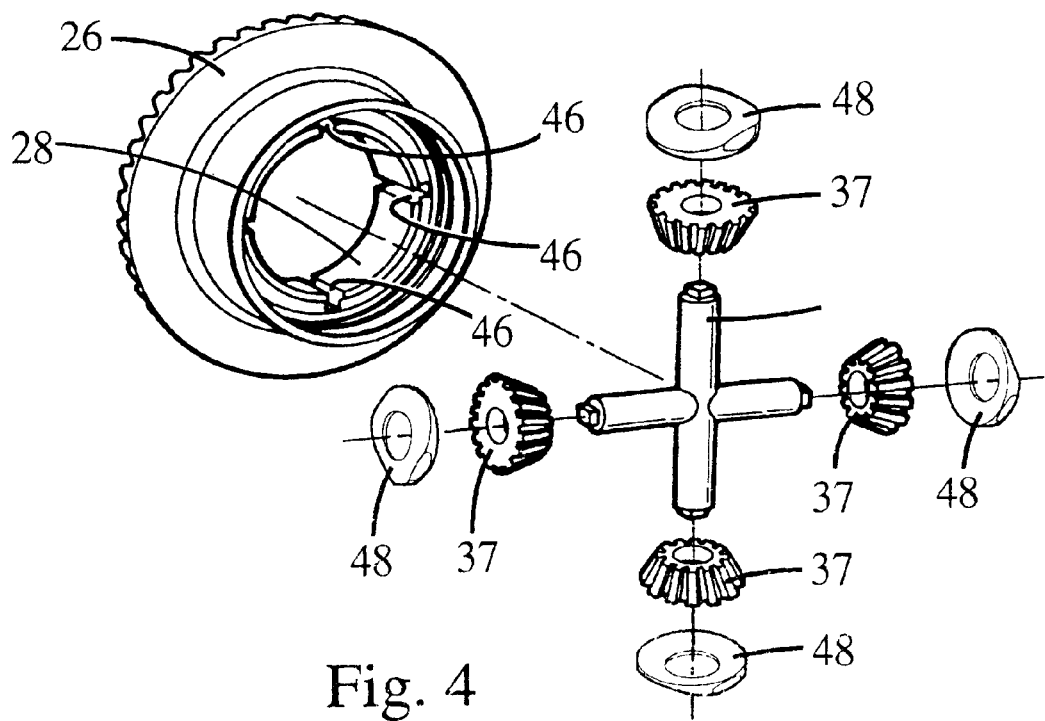
FIGS. 4 and 7 are exploded views of the hypoid ring gear, pinion pin, and pinion gears of a differential axle assembly wherein the pinion pin has four or three ends and supports four or three pinion gears respectively.
Figure 7:
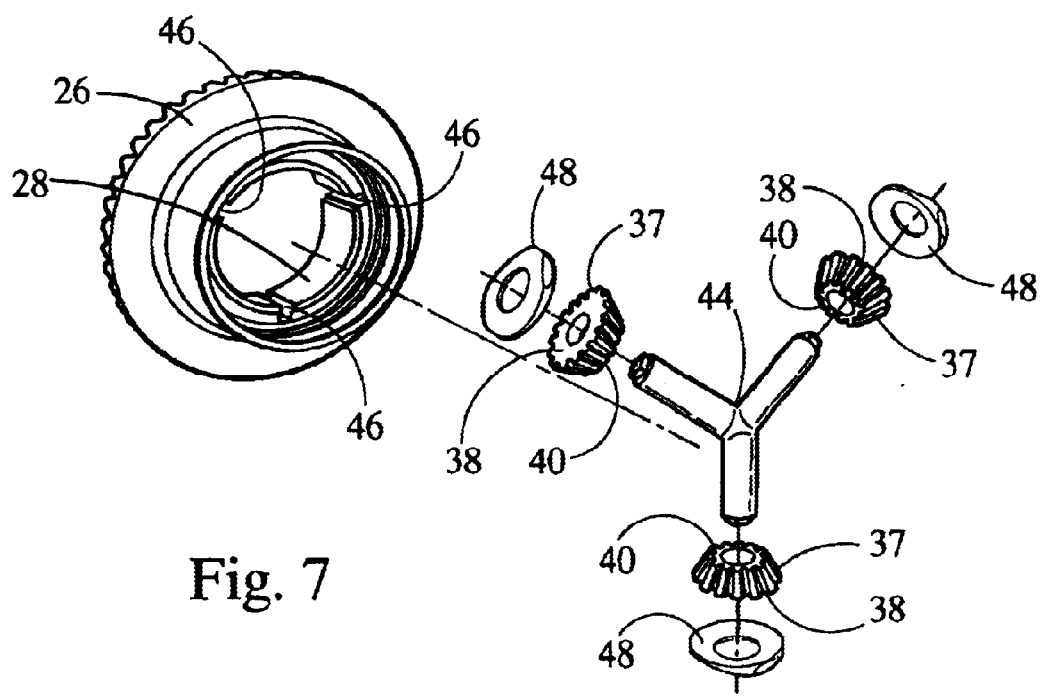

Referring to FIG. 3, in a first preferred embodiment, the pinion shaft 44 is straight and two-ended, and two pinion gears 37 are supported on opposite ends of the pinion shaft 44. Alternatively, in a second preferred embodiment, as shown in FIG. 4, the pinion shaft 44 includes two straight sections which intersect to form a cross pattern, having four ends, and includes four pinion gears 37, one pinion gear 37 supported adjacent to each of the ends of the pinion shaft 44. A third preferred embodiment is shown in FIG. 7 and includes three pinion gears. In the their preferred embodiment, a pinion shaft has three equally spaced ends, which provide support for three pinion gears 37 thereon.

Figure 6A:
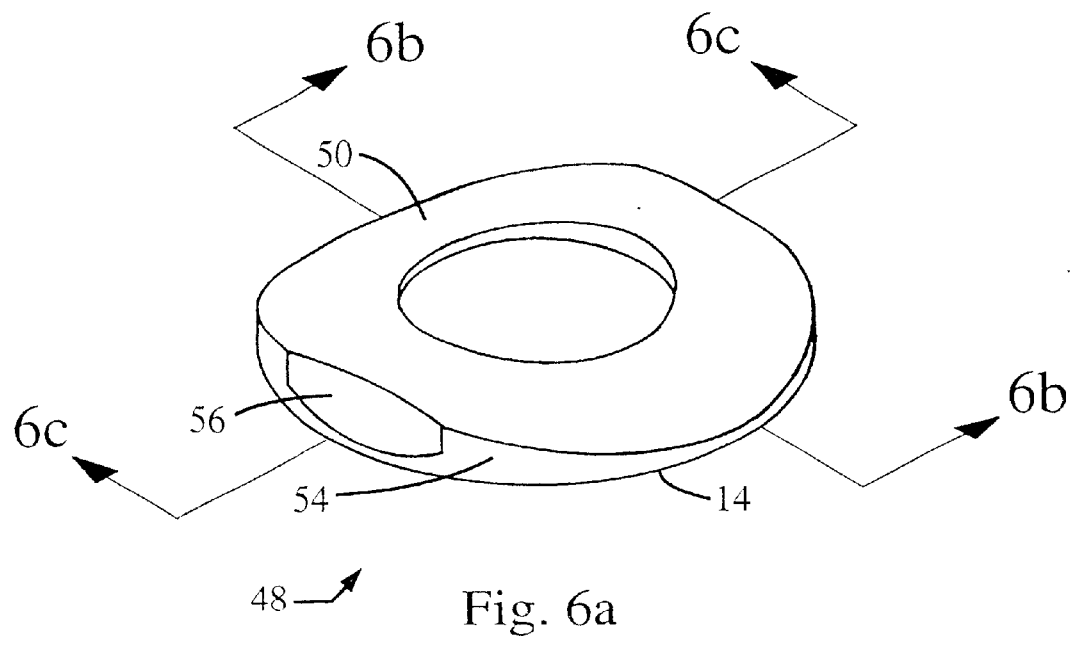
FIGS. 6a through 6c are different views of a spherical thrust washer.
Figure 6B:
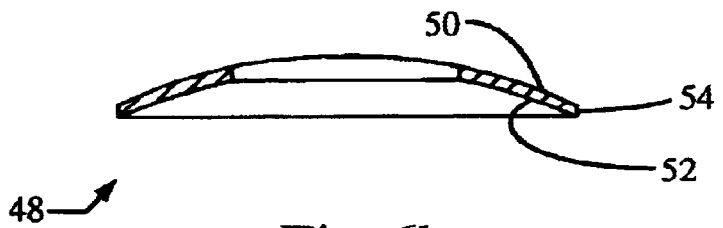
Figure 6C:
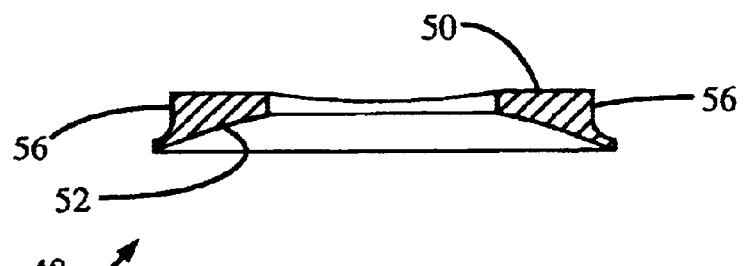

In all of the preferred embodiments, the differential axle assembly includes a plurality of spherical thrust washers 48. One spherical thrust washer 48 is positioned between each of the pinion gears 37 and the hypoid ring gear 26. Referring to FIGS. 6a, 6b, and 6c, preferably, the spherical thrust washers 48 have a cylindrical top surface 50 and a spherical bottom surface 52. The radius of the cylindrical top surface 50 matches the radius of the cylindrical inner surface 28 of the hypoid ring gear 26 such that the top surface 50 of each of the spherical thrust washers 48 smoothly engages the cylindrical inner surface 28 of the hypoid ring gear 26. The radius of the spherical bottom surface 52 of each spherical thrust washer 48 matches the radius of the outwardly facing first side 38 of the pinion gears 37 such that the bottom surface 52 of each of the spherical thrust washers 48 smoothly engages the outwardly facing first side 38 of one of the pinion gears 37.

Further, each of the spherical thrust washers 48 preferably includes an outer diameter 54 having a pair of flats 56 formed thereon. The axle housing 12 includes corresponding flats 58, shown in FIG. 2, formed therein such that the flats 56 of the spherical thrust washers 48 clear the flats 58 of the axle housing 12.

As shown in FIGS. 1 and 2, the axle housing 12 includes a pinion input housing 60 formed thereon. The pinion input housing 60 supports the input pinion gear 30 which engages the hypoid ring gear 26 at a first end 62 and is adapted to engage a drive shaft of the vehicle at a second end 64, opposite the first end 62. Rotational power is transferred from the drive shaft of the vehicle to the input pinion gear 30, on to the hypoid ring gear 26 thorough the pinion shaft 44 to the pinion gears 37, and into the side gears 16.

The foregoing discussion discloses and describes the preferred embodiments. One skilled in the art will readily recognize from such discussion, and from the accompanying drawings and claims, that changes and modifications can be made to the preferred embodiments without departing from the scope of the inventive concepts as defined in the following claims. The preferred embodiments has been described in an illustrative manner, and it is to be understood that the terminology which has been used is intended to be in the nature of words of description rather than of limitation.

What is claimed is:

1. A differential axle assembly comprising:
   an axle housing adapted to receive a pair of axle half shafts; and
   a differential gear set supported directly by said axle housing within said axle housing wherein the axle half shafts engage said differential gear set within said axle housing;
   said differential gear set including a pair of side gears substantially axially aligned and spaced apart from each other, each of said side gears being supported by said axle housing and adapted to engage an axle half-shaft; a pair of pinion gears substantially aligned and spaced apart from each other, each of said pinion gears engaging said side gears; a hypoid ring gear supported within said axle housing; a pinion shaft secured to and extending diametrically across said hypoid ring gear, said pinion shaft supporting said pinion gears in engagement with said side gears and allowing rotational movement of said pinion gears about said pinion shaft; and a spherical thrust washer positioned on said pinion shaft between each of said pinion gears and said hypoid ring gear;
   each of said spherical thrust washers including an outer diameter having a pair of flats formed thereon, said axle housing including corresponding flats formed therein such that said flats of said spherical thrust washers clear said flats of said axle housing.

2. The differential axle assembly of claim 1 wherein each of said spherical thrust washers has a spherical bottom surface and each of said pinion gears has a spherical back surface, a radius of said spherical bottom surface of said spherical thrust washers matching a radius of the back surface of said pinion gears such that said bottom surface of each of said spherical thrust washers smoothly engages said back side of one of said pinion gears.

3. The differential axle assembly of claim 1 wherein said axle housing includes a pair of opposing axially aligned openings, one of said side gears being supported within each of said opposing openings.

4. The differential axle assembly of claim 3 wherein each of said opposing axially aligned openings includes a step, said differential axle assembly further including a pair of thrust washers, one of said thrust washers being positioned between each of said side gears and each of said steps to provide axial support for said side gears.

5. The differential axle assembly of claim 4 further including a thrust bearing positioned between each of said side gears and each of said thrust washers to allow said side gears to rotate relative to said axle housing.

6. The differential axle assembly of claim 1 wherein said hypoid ring gear includes a cylindrical inner diameter having a pair of axially spaced inwardly facing annular surfaces, said axle housing including a pair of axially spaced outwardly facing annular surfaces, said hypoid ring gear being rotatably supported within said axle housing by a pair of roller bearings positioned between said inwardly facing and outwardly facing annular surfaces.

7. The differential axle assembly of claim 6 wherein said roller bearings are ball bearings.

8. The differential axle assembly of claim 6 wherein said roller bearings are angular contact bearings.

9. The differential axle assembly of claim 6 wherein said cylindrical inner diameter of said hypoid ring gear includes a plurality of notches formed therein between said axially spaced inwardly facing annular surfaces, said pinion shaft engaging said notches to support said pinion shaft on said hypoid ring gear.

10. The differential axle assembly of claim 9 wherein said differential gear set includes a two ended pinion shaft having two pinion gears supported on said pinion shaft.

11. The differential axle assembly of claim 9 wherein said differential gear set includes a three ended pinion shaft having three pinion gears supported on said pinion shaft.

12. The differential axle assembly of claim 9 wherein said differential gear set includes a four ended pinion shaft having four pinion gears supported on said pinion shaft.

13. The differential axle assembly of claim 1 further including a pinion input housing formed thereon, said pinion input housing supporting an input pinion gear which engages said hypoid ring gear at a first end and is adapted to engage a drive shaft of the vehicle at a second end, opposite said first end.

14. The differential axle assembly of claim 1 wherein each of said spherical thrust washers has a cylindrical top surface, a radius of said cylindrical top surface of said spherical thrust washers matching a radius of a cylindrical inner surface of said hypoid ring gear such that said top surface of each of said spherical thrust washers smoothly engages said cylindrical inner surface of said hypoid ring gear.

15. A differential axle assembly comprising:
an axle housing adapted to receive a pair of axle half shafts and including a pair of opposing axially aligned openings; and
a differential gear set including a pair of side gears substantially axially aligned and spaced apart from each other, each of said side gears being supported within one of said opposing axially aligned openings and adapted to engage an axle half-shaft, a plurality of pinion gears substantially aligned and spaced apart from each other, each of said pinion gears engaging said side gears, a hypoid ring gear rotatably supported within said axle housing, and a pinion shaft secured to and extending diametrically across said hypoid ring gear, said pinion shaft supporting said pinion gears in engagement with said side gears and allowing rotational movement of said pinion gears about said pinion shaft;
said hypoid ring gear including a cylindrical inner diameter having a pair of axially spaced inwardly facing annular surfaces, said axle housing including a pair of axially spaced outwardly facing annular surfaces, said hypoid ring gear being rotatably supported within said axle housing by a pair of roller bearings positioned between said inwardly facing and outwardly facing annular surfaces; and
a spherical thrust washer positioned on said pinion shaft between each of said pinion gears and said hypoid ring gear, each of said spherical thrust washers including a cylindrical top surface having a radius that matches a radius of said cylindrical inner surface of said hypoid ring gear, a spherical bottom surface having a radius that matches a radius of a back surface of said pinion gears, and an outer diameter having a pair of flats formed thereon, said axle housing including corresponding flats formed therein such that said flats of said spherical thrust washers clear said flats of said axle housing.

16. The differential axle assembly of claim 15 wherein each of said opposing axially aligned openings includes a step, said differential axle assembly further including a pair of thrust washers, one of said thrust washers being positioned between each of said side gears and each of said steps to provide axial support for said side gears.

17. The differential axle assembly of claim 16 further including a thrust bearing positioned between each of said side gears and each of said thrust washers to allow said side gears to rotate relative to said axle housing.

18. The differential axle assembly of claim 15 wherein said roller bearings are one of either ball bearings or angular contact bearings.

19. The differential axle assembly of claim 15 wherein said cylindrical inner diameter of said hypoid ring gear includes a plurality of notches formed therein between said axially spaced inwardly facing annular surfaces, said pinion shaft engaging said notches to support said pinion shaft on said hypoid ring gear.

20. The differential axle assembly of claim 19 wherein said pinion shaft includes either two, three, or four pinion gears supported on said pinion shaft.

21. The differential axle assembly of claim 15 further including a pinion input housing formed thereon, said pinion input housing supporting an input pinion gear which engages said hypoid ring gear at a first end and is adapted to engage a drive shaft of the vehicle at a second end, opposite said first end.

* * * * *

UNITED STATES PATENT AND TRADEMARK OFFICE
CERTIFICATE OF CORRECTION

PATENT NO. : 6,743,138 B2
DATED : June 1, 2004
INVENTOR(S) : Richard M. Krzesicki et al.

It is certified that error appears in the above-identified patent and that said Letters Patent is hereby corrected as shown below:

Title page,
Item [56], References Cited, FOREIGN PATENT DOCUMENTS, insert the following:
-- DE    4417373 A1    11/1995
   DE    10043622 A1    3/2002
   FR    1.198.091    12/1959
   EP    1348589 A2    10/2003
   GB    2387884 A    10/2003
   GB    2383617 A    7/2003 --.

Signed and Sealed this

Twelfth Day of April, 2005

JON W. DUDAS
*Director of the United States Patent and Trademark Office*